(12) United States Patent
Tsutsumi et al.

(10) Patent No.: US 7,319,687 B2
(45) Date of Patent: Jan. 15, 2008

(54) WIRELESS LAN SYSTEM, HOST APPARATUS AND WIRELESS LAN BASE STATION

(75) Inventors: Takayuki Tsutsumi, Kawasaki (JP); Yoshikazu Kobayashi, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 1045 days.

(21) Appl. No.: 10/252,387

(22) Filed: Sep. 24, 2002

(65) Prior Publication Data

US 2003/0185186 A1    Oct. 2, 2003

(30) Foreign Application Priority Data

Mar. 29, 2002    (JP)    ............... 2002-097916

(51) Int. Cl.
  *H04Q 7/24*    (2006.01)
  *H04L 12/28*   (2006.01)
(52) U.S. Cl. .................. 370/338; 370/401
(58) Field of Classification Search ........ 370/313, 370/338, 401, 412
See application file for complete search history.

(56) References Cited

U.S. PATENT DOCUMENTS

| | | | | |
|---|---|---|---|---|
| 6,115,365 A * | 9/2000 | Newberg et al. | ............ | 370/312 |
| 6,577,609 B2 * | 6/2003 | Sharony | ............ | 370/312 |
| 6,700,869 B1 * | 3/2004 | Falco et al. | ............ | 370/230 |
| 6,738,381 B1 * | 5/2004 | Agnevik et al. | ......... | 370/395.7 |
| 6,865,185 B1 * | 3/2005 | Patel et al. | ............ | 370/412 |
| 6,978,144 B1 * | 12/2005 | Choksi | ............ | 455/452.2 |
| 7,039,032 B1 * | 5/2006 | Ho et al. | ............ | 370/338 |
| 7,085,579 B2 * | 8/2006 | Mizutani et al. | ......... | 455/512 |
| 7,088,698 B1 * | 8/2006 | Harsch | ............ | 370/338 |

FOREIGN PATENT DOCUMENTS

| | | |
|---|---|---|
| JP | 10-084343 | 3/1998 |
| JP | 2001-036578 | 2/2001 |
| JP | 2001-094572 | 4/2001 |
| JP | 2001-128212 | 5/2001 |
| JP | 2002-010341 | 1/2002 |
| JP | 2002-026931 | 1/2002 |
| WO | WO 01/37497 | 5/2001 |
| WO | WO 01/43467 | 6/2001 |
| WO | WO 01/45328 | 6/2001 |

* cited by examiner

*Primary Examiner*—Chau Nguyen
*Assistant Examiner*—Marcus R Smith
(74) *Attorney, Agent, or Firm*—Young & Thompson

(57) ABSTRACT

Each wireless LAN base station comprises priority queue table, a header analyzing circuit determining a priority of data transmitted from a wireless terminal based on a header of the data and the priority queue table, priority queues for storing data, a control circuit for enqueueing the data transmitted from the wireless terminal to the priority queue and updating the priority queue table with priority information transmitted from the host apparatus, and a transmission control circuit for transmitting the data which have been stored in the priority queues and the priority queue table. A host apparatus comprises a queue information table containing the priority queue tables of the base stations, and a control circuit for determining a priority of data between wireless terminals on the basis of the queue information table and transmitting the priority information to the plurality of wireless LAN base stations via which the data route.

31 Claims, 11 Drawing Sheets

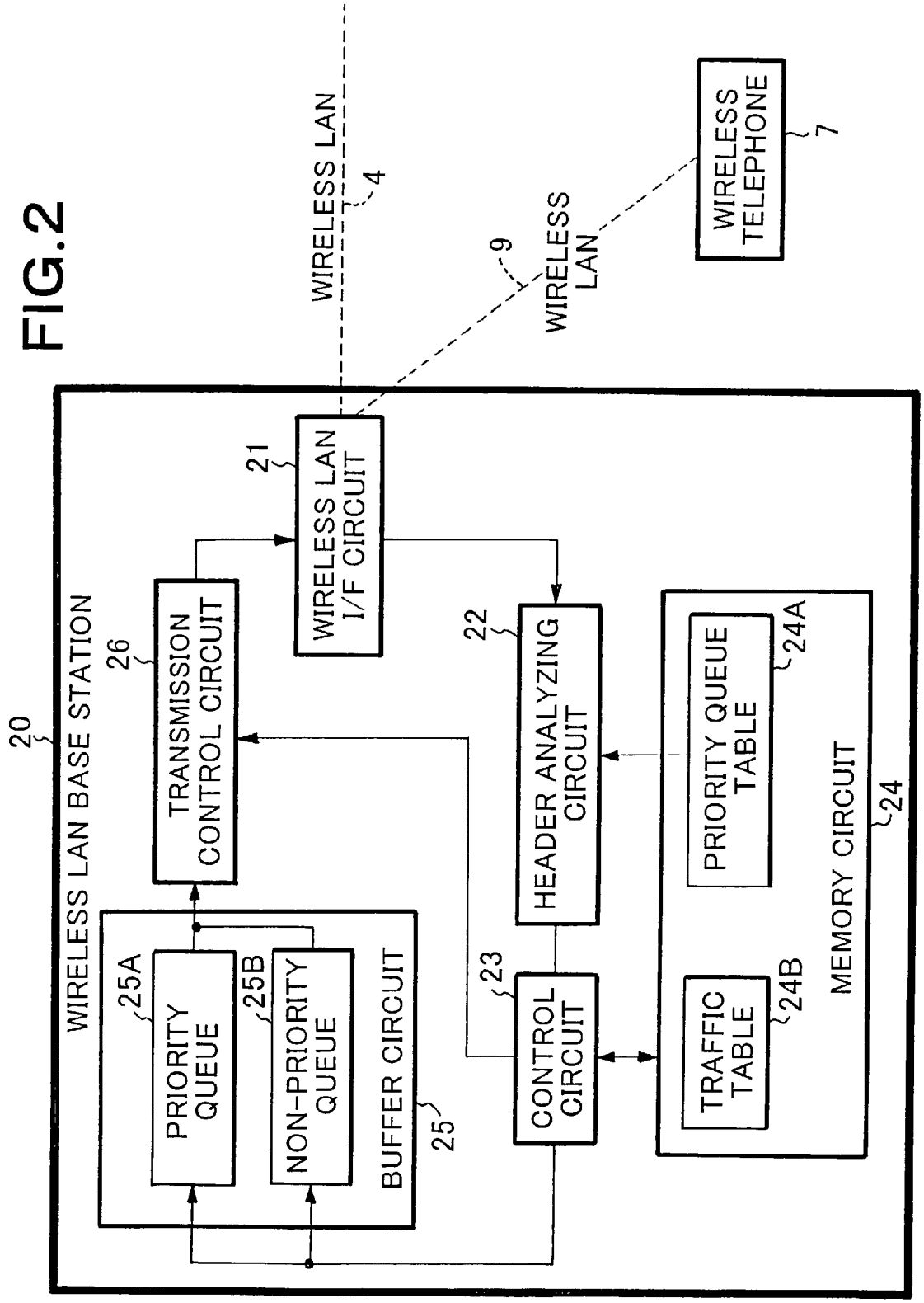

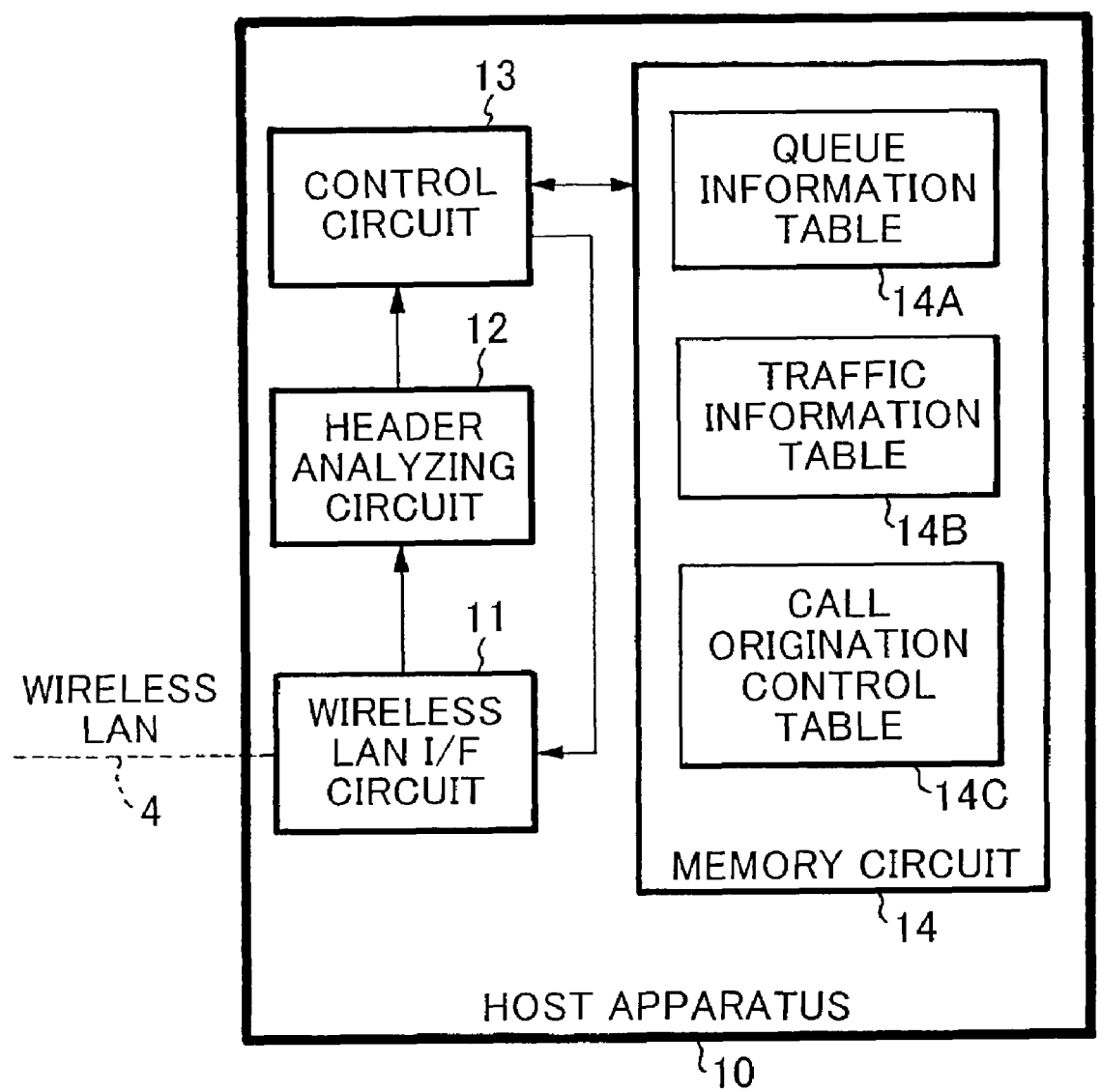

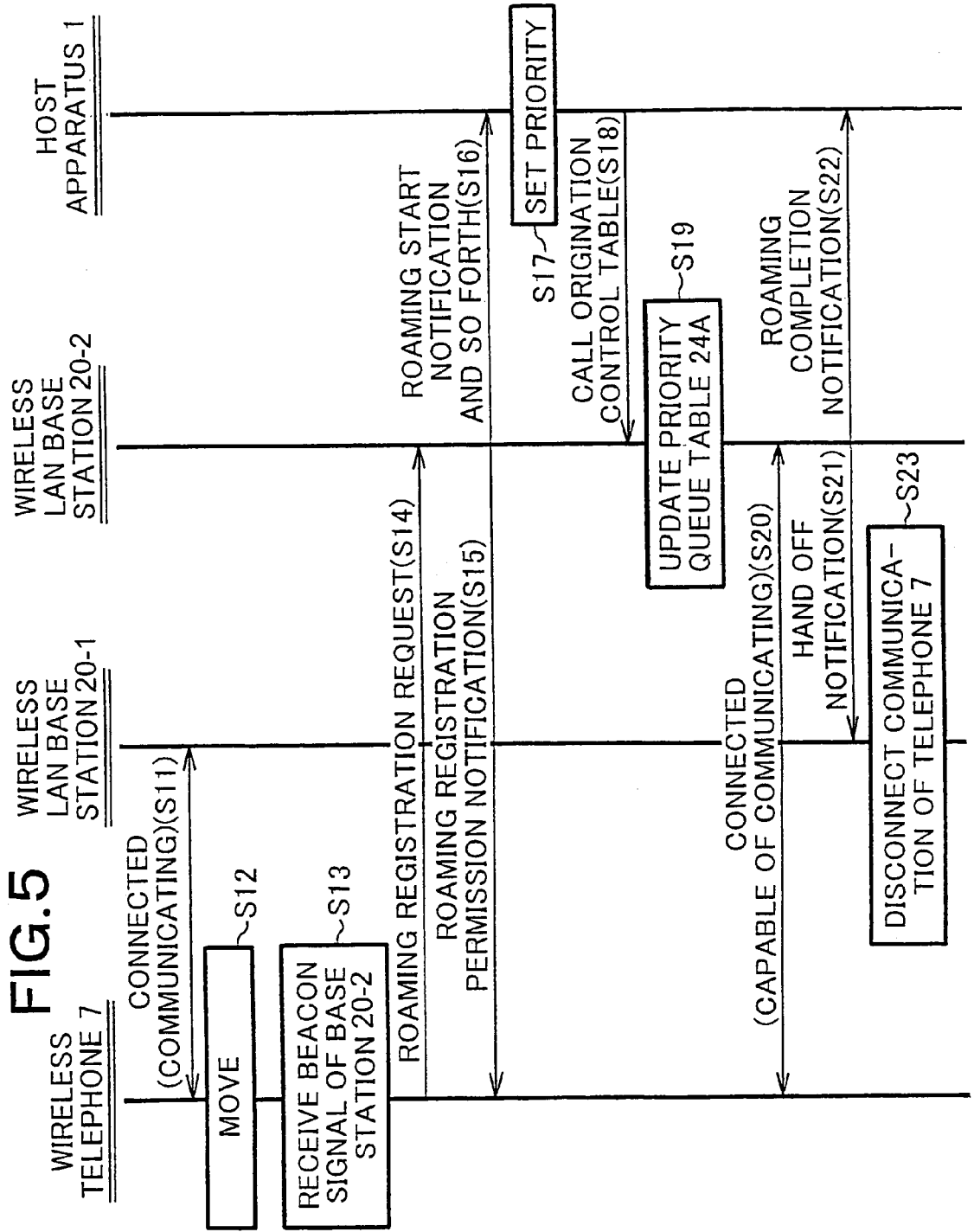

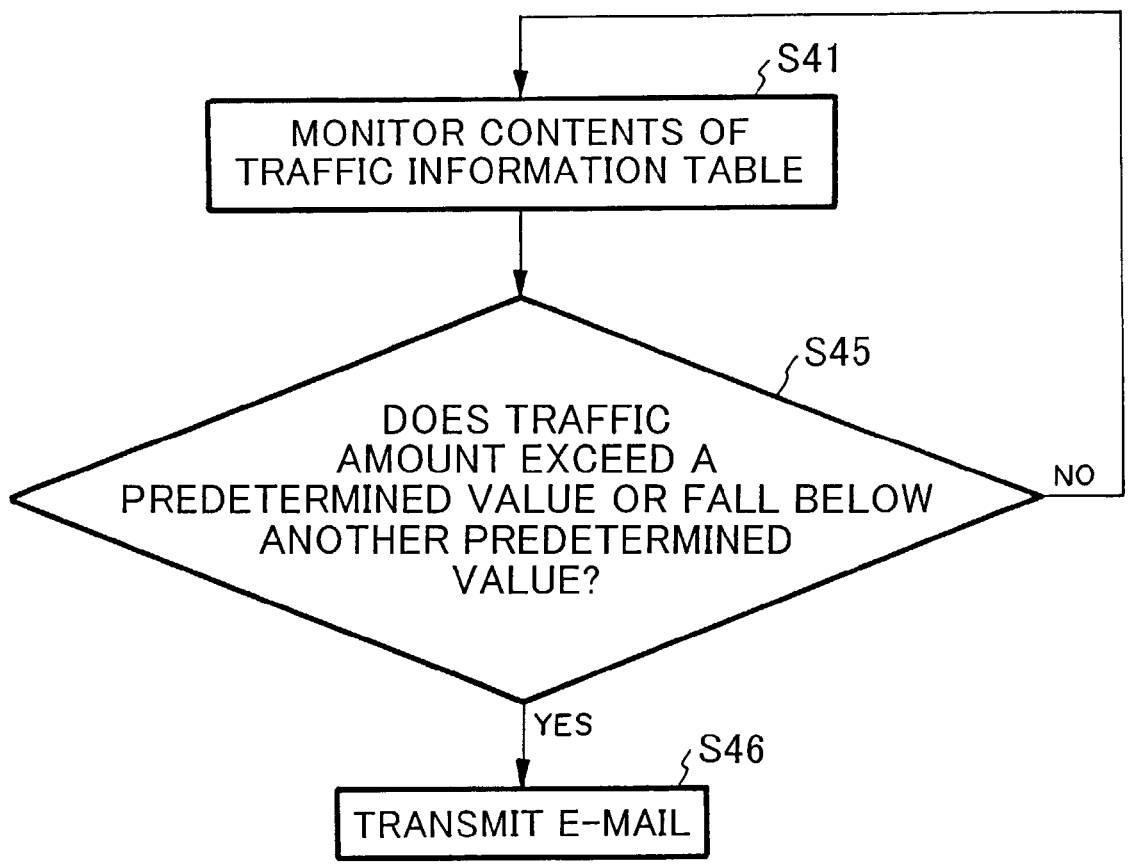

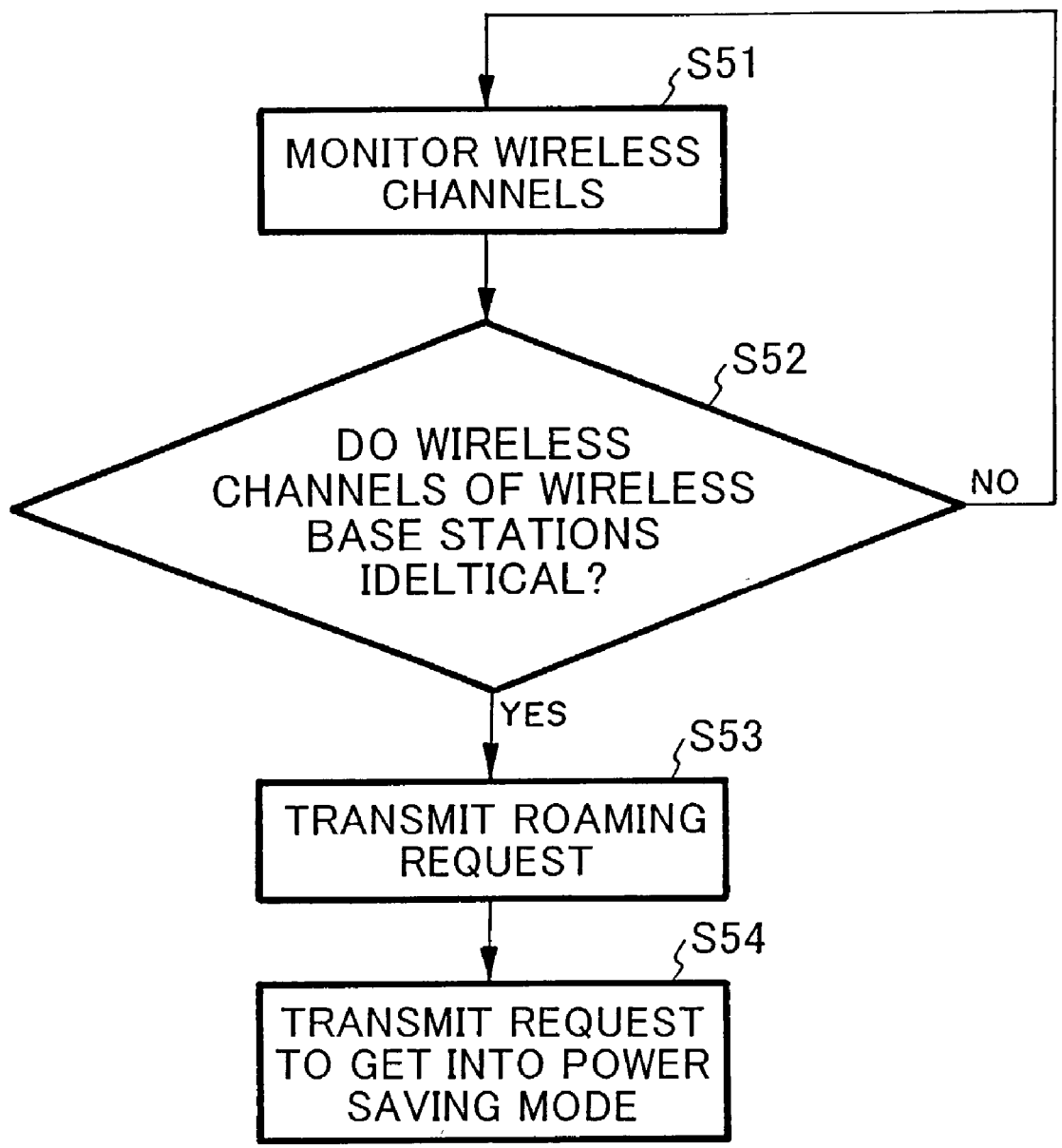

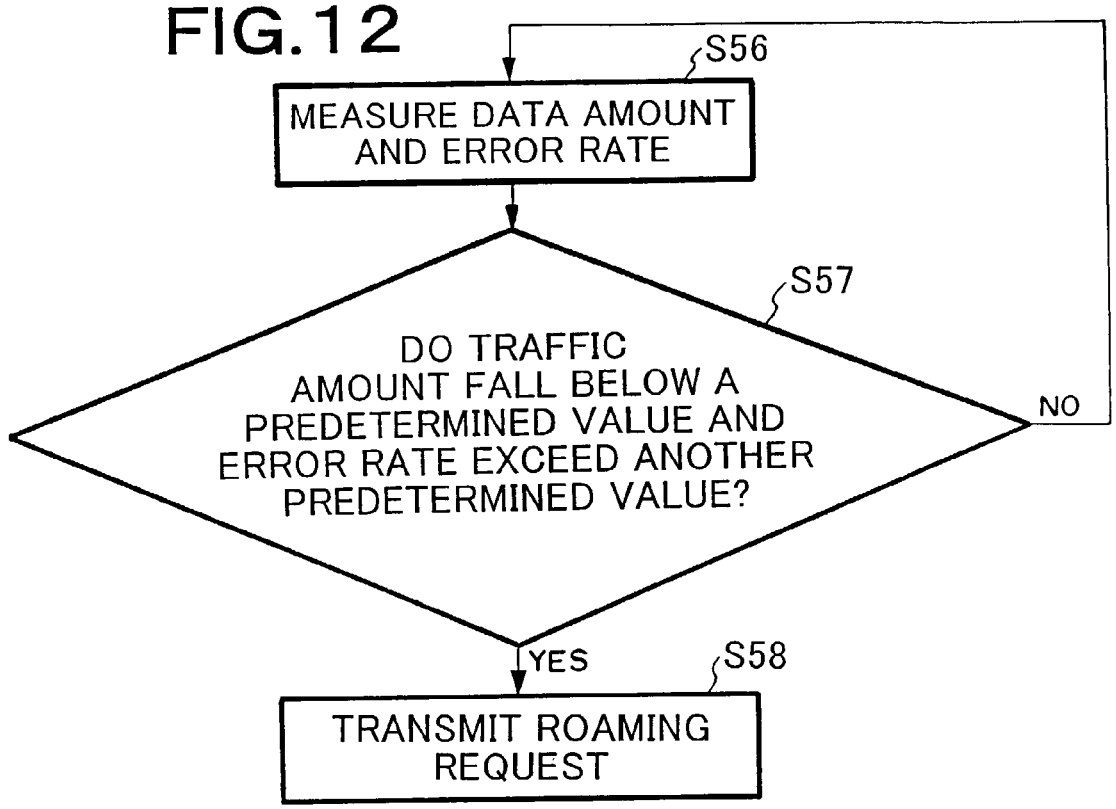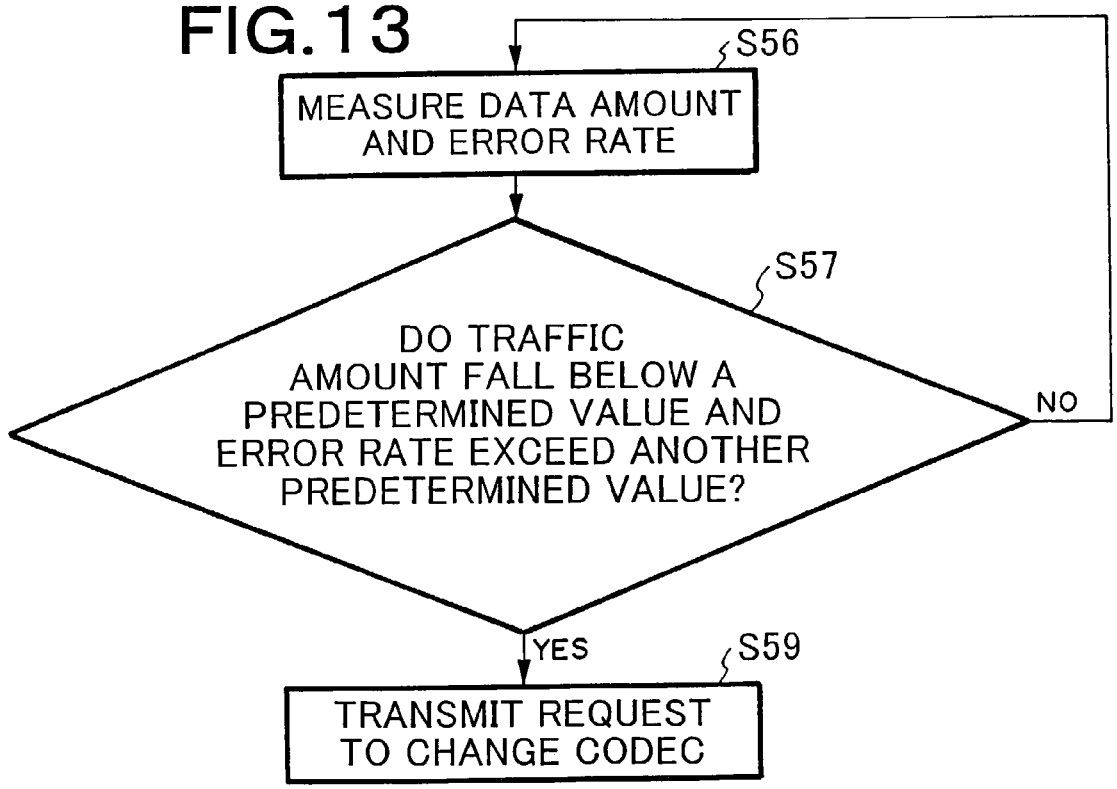

WIRELESS LAN SYSTEM, HOST APPARATUS AND WIRELESS LAN BASE STATION

BACKGROUND OF THE INVENTION

1. Field of the Invention

The present invention relates to a wireless LAN system, a host apparatus and a wireless LAN base station, and more particularly, to a wireless LAN system in which wireless terminals and base stations are connected by wireless LANs, a host apparatus which controls call origination of the wireless terminals through the wireless LAN base stations, and the wireless LAN base station.

2. Description of the Related Art

From the first, wired LANs (Local Area Networks) have been developed and used. Recent days, however, wireless LANs in each of which at least parts of a wired network are replaced by wireless lines are developed and used because the speed of the wireless lines is increased and mobile computing technology and mobile terminals have been developed.

In the wireless LAN, improvement of QoS (Quality of Service) is an important theme in order to realize the wide bandwidth and short delay time which are necessary for users and applications. Responding to this, there is proposed a system in which a wireless LAN base station determines priority in accordance with the type of data, and it sends data in order of the priority. For example, audio and motion picture data which need to be transmitted in real time are assigned higher priority than the other data, whereby it is possible that the audio and motion picture data are transmitted in a constant speed even if the amount of the other transmission data varies.

In conventional wireless LAN systems, service sets each of which comprises a wireless LAN base station and wireless terminals connected thereto are provided individually, and QoS of the wireless LAN is determined for each of the service sets.

In conventional wireless LAN systems, however, there is disadvantage that QoS is not assured when vast data of the same priority are sent to a single wireless base station because the data of the same priority are sent evenly and the transmission speed is decreased to be a bottleneck.

In addition, there is another disadvantage that QoS is not assured because the priority of data is determined for each of the service sets and the priorities of data transmitted via a plurality of wireless LAN base stations may differ between wireless LAN base stations.

In such condition, a roaming from a wireless LAN base station to another wireless LAN base station is conducted and transmission connection is switched, the priority of data changes, and therefore, QoS in the transmission line is not assured.

SUMMARY OF THE INVENTION

The present invention has been made in order to overcome the aforementioned disadvantages. It is an object of the present invention to improve QoS in transmission line.

According to a first aspect of the present invention, there is provided a wireless LAN system comprising: a plurality of wireless LAN base stations, each of which is connected with wireless terminals via a wireless LAN; and a host apparatus which controls call originations of the wireless terminals via the plurality of wireless LAN base stations, wherein each of the plurality of wireless LAN base stations comprises: a priority queue table which contains relations between headers of data and priorities; a header analyzing circuit which determines a priority of data transmitted from a wireless terminal on the basis of a header of the data transmitted from the wireless terminal and the priority queue table; priority queues which temporarily store data of respective priorities; a first control circuit which enqueues the data transmitted from the wireless terminal to the priority queue of the priority determined by the header analyzing circuit and updates the priority queue table on the basis of priority information transmitted from the host apparatus; and a transmission control circuit which transmits the data which have been stored in the priority queues in order of priority and transmits the priority queue table, wherein the host apparatus comprises: a queue information table which contains the priority queue tables of the plurality of wireless LAN base stations; and a second control circuit which determines a priority of data to be transmitted between wireless terminals on the basis of the queue information table and transmits the priority information containing the determined priority and side information to at least one of the plurality of wireless LAN base stations via which the data to be transmitted between the wireless terminals route.

In the wireless LAN system, the second control circuit may comprise means, if the data to be transmitted between the wireless terminals route via at least two wireless LAN base stations, for determining the priority of the data so that the priority in one of at least the two wireless LAN base stations is the same as or close to the priority in the other of at least the two wireless LAN base stations.

In the wireless LAN system, the second control circuit may comprise means, if a wireless terminal roams from a first wireless LAN base station to a second wireless LAN base station, for determining the priority of the data so that the priority in the second wireless LAN base station is the same as or close to the priority in the first wireless LAN base station.

In the wireless LAN system, the wireless LAN system may contain a plurality of subnets, and the second control circuit may comprise: means for having each wireless terminal transmit data to an address of the host apparatus; means for changing the address of the data received by the host apparatus to an address of a destination wireless terminal and transferring the data to the address of the destination wireless terminal; and means, if the destination wireless terminal roams from a first subnet to a second subnet, for notifying the destination wireless terminal of a new address of the destination wireless terminal, changing the address of the data received by the host apparatus to the new address of the destination wireless terminal and transferring the data to the new address of the destination wireless terminal.

In the wireless LAN system, the host apparatus may further comprise a traffic information table which stores traffic amounts in the plurality of wireless LAN base stations, and the second control means may comprise means, if increase in the traffic amount of a wireless LAN base station is detected by monitoring the traffic information table, for requesting a wireless terminal connected to the wireless LAN base station to roam to another wireless LAN base station.

In the wireless LAN system, the host apparatus may further comprise a traffic information table which stores traffic amounts in the plurality of wireless LAN base stations, and the second control means may comprise means, if increase in the traffic amount of a wireless LAN base station is detected by monitoring the traffic information table, for requesting a wireless terminal connected to the wireless LAN base station to change a codec.

In the wireless LAN system, the host apparatus may further comprise a traffic information table which stores traffic amounts in the plurality of wireless LAN base stations, and the second control means may comprise means, if abnormality in the traffic amount of a wireless LAN base station is detected by monitoring the traffic information table, for sending a notification of the abnormality to an e-mail address.

In the wireless LAN system, the second control means may comprise means, if it is detected that at least two wireless LAN base stations use the same wireless channel, for requesting a wireless terminal connected to one of at least the two wireless LAN base stations to roam to another wireless LAN base station and requesting at least one of at least the two wireless LAN base stations to get into power saving mode.

In the wireless LAN system, the second control means may comprise means, if it is detected that a traffic amount of data of a wireless terminal falls below a predetermined value and an error rate of the data exceeds another predetermined value, for requesting the wireless terminal to roam to another wireless LAN base station.

In the wireless LAN system, the second control means may comprise means, if it is detected that a traffic amount of data of a wireless terminal falls below a predetermined value and an error rate of the data exceeds another predetermined value, for requesting the wireless terminal to change a codec.

According to a second aspect of the present invention, there is provided a method for determining a priority of data transmitted between wireless terminals via wireless LAN base stations comprising the steps of: causing each of the wireless LAN base stations to hold a priority queue table which contains relations between headers of data and priorities; causing a plurality of wireless LAN base stations to transmit respective priority queue tables to a host apparatus; causing the host apparatus to hold a queue information table which contains the queue tables transmitted from the plurality of wireless LAN base stations; causing the host apparatus to determine a priority of data to be transmitted between wireless terminals on the basis of the queue information table; causing the host apparatus to transmit priority information containing the determined priority and side information to at least one of the plurality of wireless LAN base stations via which the data to be transmitted between the wireless terminals route; causing at least one of the plurality of wireless LAN base stations via which the data to be transmitted between the wireless terminals route to update the priority queue table on the basis of the priority information transmitted from the host apparatus; and causing at least one of the plurality of wireless LAN base station via which the data to be transmitted between the wireless terminals route to determine a priority of data to be transmitted from one of the wireless terminals on the basis of a header of the data and the priority queue table.

These and other objects, features and advantages of the present invention will become more apparent in the light of the following detailed description of the best mode embodiments thereof, as illustrated in the accompanying drawings.

BRIEF DESCRIPTION OF THE DRAWINGS

FIG. 2 is a block diagram showing one embodiment of the structure of a wireless LAN base station;

FIG. 3 is a block diagram showing one embodiment of the structure of a host apparatus;

FIG. 5 is a sequence diagram when a wireless telephone roams between wireless LAN base stations;

FIG. 10 is a flow chart showing operation of the control circuit of the host apparatus when it detects that a traffic amount of a wireless LAN base station exceeds a predetermined value or falls below another predetermined value;

FIG. 11 is a flow chart showing operation of the control circuit of the host apparatus when it detects that two or more wireless LAN base stations use the same wireless channel;

FIG. 12 is a flow chart showing operation of the control circuit of the host apparatus when it detects that a traffic amount of data a wireless telephone falls below a predetermined value and an error rate of the data exceeds another predetermined value; and FIG. 13 is a flow chart showing another operation of the control circuit of the host apparatus when it detects that a traffic amount of data a wireless telephone falls below a predetermined value and an error rate of the data exceeds another predetermined value

DETAILED DESCRIPTION OF THE PREFERRED EMBODIMENT

Preferred embodiment according to the present invention will be described with reference to the accompanying drawings.

Figure 1:
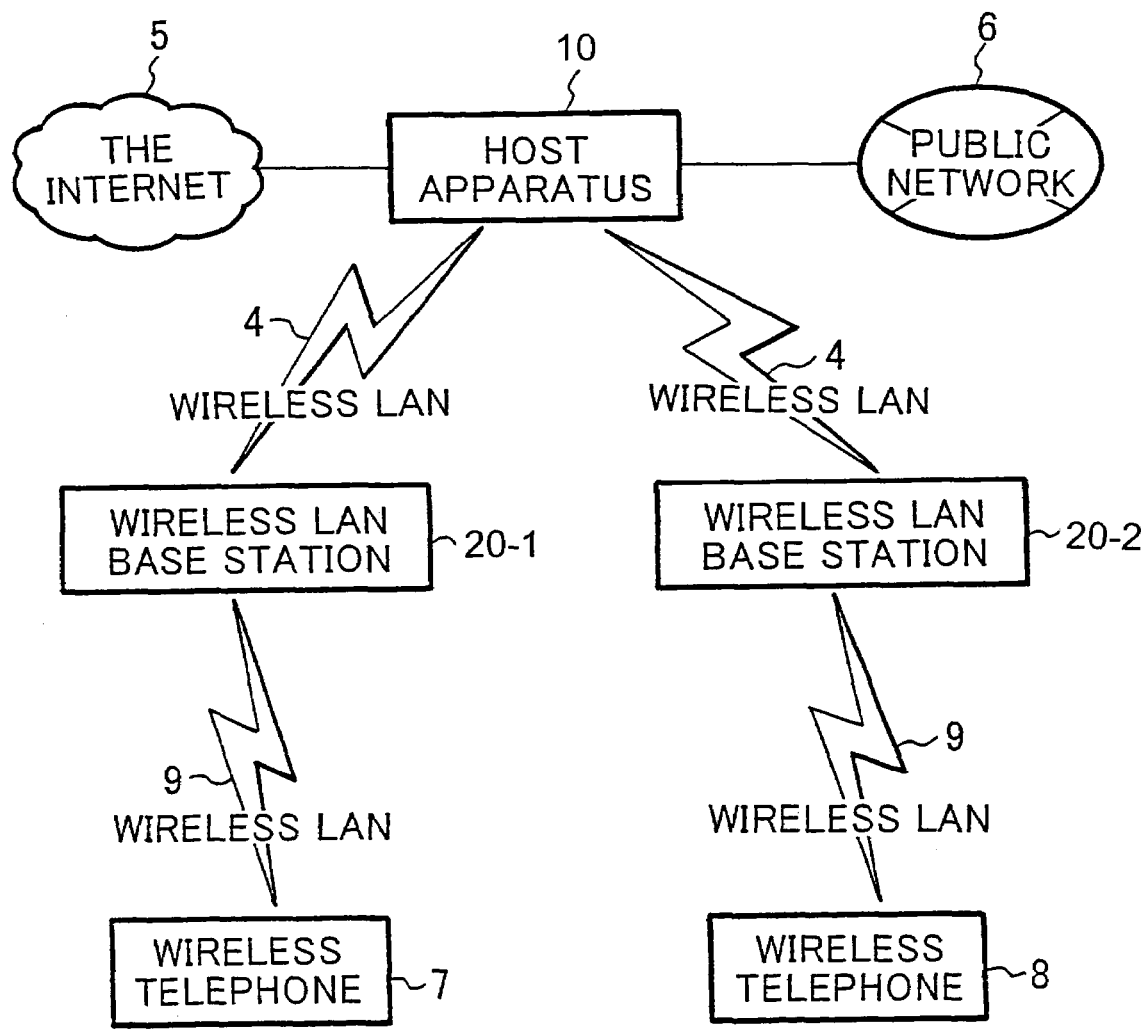
FIG. 1 is a block diagram showing the whole structure of a wireless LAN system which is one embodiment of the present invention.

FIG. 1 is a block diagram showing the whole construction of a wireless LAN system which is one embodiment of the present invention. This wireless LAN system comprises a plurality of wireless telephones (or wireless terminals) 7 and 8, a plurality of wireless LAN base stations 20-1 and 20-2 which are connected to the wireless telephones 7 and 8 via wireless LANs 9, respectively, and a host apparatus 10 which controls the call origination of the wireless telephones 7 and 8. The host apparatus 10 comprises interfaces with the Internet 5 and public network 6. In FIG. 1, the host apparatus 10 and the wireless LAN base stations 20-1 and 20-2 are connected via wireless LANs 4. However, the present invention is not limited to this structure, and they may be connected via a priority LAN, for example.

Next, with reference to FIGS. 2 and 3, more details of the structures of the wireless LAN base stations 20-1 and 20-2 and the host apparatus 10 will be described.

FIG. 2 is a block diagram showing one structure of the wireless LAN base station 20. The wireless LAN base station 20 comprises a wireless LAN I/F circuit 21, a header analyzing circuit 22, a control circuit 23, a memory circuit 24, a buffer circuit 25 and a transmission control circuit 26.

The wireless LAN I/F circuit 21 is an interface with the wireless LANs 4 and 9 and performs data exchange with the host apparatus 10 and the wireless telephone 7 or 8 via the wireless LAN 4 and 9, respectively. If the host apparatus 10 and the wireless LAN base station 20 are connected via a LAN, then a LAN I/F needs to be provided.

The memory circuit 24 memorizes a priority queue table 24A and a traffic table 24B. The priority queue table 24A is a priority table in which the header and priority of data are associated to each other. The priorities have two or more levels, but may have only one level. The traffic table 24B is a table in which the SSID, wireless channel, transmission/reception amount, number of terminals and so forth of the local network which comprises the wireless LAN base station 20 and wireless telephones 7 connected thereto.

The header analyzing circuit 22 determines whether or not the data received by the wireless LAN I/F circuit 21 are priority data. To describe in more detail, it analyzes the header of the data received by the wireless LAN I/F circuit 21, determines that the data are priority data if the same header as that of the data exists in the priority queue table 24A, determines that the data are not priority data if the same header as that of the data does not exist in the priority queue table 24A, and determines the level of the priority if the data are the priority data.

The control circuit 23 sends the priority data which have been a determined by the header analyzing circuit 22 to a priority queue 25A and sends the non-priority data to a non-priority queue 25B. The control circuit 23 also has a function of periodically reading information of the priority queue table 24A and the traffic table 24B from the memory circuit 24 and sending them to the priority queue 25A of the buffer circuit 25 and a function of updating the priority queue table 24A on the basis of priority information represented by a call origination controlling table 14C transmitted from the host apparatus 10.

The priority queue 25A of buffer circuit 25 buffers the priority data transmitted from the control circuit 23 and information of the priority queue table 24A and the traffic table 24B. The non-priority queue 25B buffers the non-priority data.

If the priorities have two or more levels, then as many priority queues as the number of levels are provided, and each priority queue buffers data of the priority corresponding thereto. In addition, a transmission band is assigned to each priority queue beforehand. This transmission band may be identical among all the priority queues or may be different depending on the priority.

The transmission control circuit 26 conducts control to send the priority data buffered in the priority queue 25A via the wireless LAN I/F circuit 21 prior to the non-priority data buffered in the non-priority queue 25B. If a plurality of priority queues are provided, then it transmits data in order of priority. The transmission control circuit 26 may transmit data at the same intervals with reference to a beacon signal transmitted from the wireless LAN base station 20.

Though the above description was made for one example of the wireless LAN base station 20-1, the other wireless LAN base station 20-2 also has the similar construction, and explanation thereof is omitted.

FIG. 3 is a block diagram showing one example of the structure of the host apparatus 10. The host apparatus 10 as shown in FIG. 3 comprises a wireless LAN I/F circuit 11, a header analyzing circuit 12, a control circuit 13 and a memory circuit 14.

The wireless LAN I/F circuit 11 is an interface with the wireless LAN 4, and is capable of performing data exchange with the wireless LAN base stations 20-1 and 20-2 via the wireless LANs 4, respectively. If the host apparatus 10 and the wireless LAN base stations 20-1 and 20-2 are connected via a LAN, then a LAN I/F needs to be provided.

The header analyzing circuit 12 analyzes the header of the data received by the wireless LAN I/F circuit 11, and outputs the result thereof to the control circuit 13.

The memory circuit 14 memorizes a queue information table 14A, a traffic information table 14B and a call origination control table 14C. The queue information table 14A is a table in which the information in the priority queue tables 24A of wireless LAN base stations 20-1 and 20-2 is recorded. Situation of the use of the priority queues of the wireless LAN base station 20-1 and 20-2 is obtained from this table. The traffic information table 14B is a table in which the information in the traffic table 24A of wireless LAN base stations 20-1 and 20-2 is recorded. The traffics in the wireless LAN base stations 20-1 and 20-2 are obtained from this table. The call origination control table 14 is a table in which call origination information, such as MAC addresses, communication port numbers, protocol numbers, codec types and priorities of the wireless telephones 7 and 8 which originate calls is recorded. The call origination information is sufficient if it contains predetermined header information which enables specification of data to which priority is set. Another example of the header information is an IP header and a TCP header, and the header information is not limited to these.

The control circuit 13 controls the operation of the whole of the host apparatus 10, has a function of updating the queue information table 14A and the traffic information table 14B on the basis of the priority queue tables 24A and the traffic tables 24B, respectively, transmitted from the wireless LAN base stations 20-1 and 20-2, and has a function of setting priorities of the wireless telephones 7 and 8 of which call originations are controlled and sending the information of the call origination control table 14C containing the information indicating these priorities to the wireless LAN base stations 20-1 and 20-2 via which the communication lines route.

Next, the operation of the wireless LAN system as shown in FIGS. 1-3 will be described.

First, the operation of updating tables of the host apparatus will be described.

In each of the wireless LAN base stations 20-1 and 20-2, the control circuit 23 periodically reads the information of the priority queue table 24A and the traffic table 24B from the memory circuit 24 and sends the information to the priority queue 25A of the buffer circuit 25. The transmission control circuit 26 transmits the information to the host apparatus 10 via the wireless LAN I/F circuit 21. In the host apparatus, the 4 header analyzing circuit 12 analyzes the header of the data of the priority queue table 24A and the traffic table 24B received via the wireless I/F circuit 11. The control circuit 13 writes the information of the priority queue table 24A and the information of the traffic table 24B to the priority queue table 14A and the traffic information table 14B of the memory circuit 14, respectively.

The above operation is conducted for all the wireless LAN base stations 20, whereby the host apparatus 10 grasps the situation of the use of the priority queues and traffic of all the wireless LAN base stations 20.

Next, the operation of controlling the call origination will be described.

Suppose, for example, a call origination request is transmitted from the wireless telephone 7 to the host apparatus 10 via the wireless LAN base station 20-1. In the host apparatus 10, the header analyzing circuit 12 analyzes the header of the call origination request received by the wireless I/F circuit 11, and the control circuit 13 sets the priority of the conversation data with reference to the queue table 14A. After the priority of the conversation data is set, the priority is written to the queue information table 14A and the call control table 14C of the memory circuit 14. Thereafter, the information of the call origination control table 14C indicating not only the priority of the conversation data in the wireless LAN base station 20-1 but also side information such as the MAC address, communication port number, protocol number and codec type of the wireless telephone 7 is transmitted to the wireless LAN base station 20-1. In addition, the information of the call origination control table 14C indicating not only the priority of the conversation data in another wireless LAN base station 20 which accommodates the conversation partner but also side information such as the MAC address, communication port number, protocol number and codec type of the conversation partner is transmitted to the wireless LAN base station 20 which accommodates the conversation partner.

In each of the wireless LAN base stations 20-1 and 20-2, the header analyzing circuit 22 analyzes the header of the call origination control table 14C received by the wireless I/F circuit 21, and the control circuit 23 writes the information on the priority represented by the call origination control table 14C to the priority queue table 24A.

When a connection is established between the wireless telephone 7 and the conversation partner, in the wireless LAN base station 20-1, the header analyzing circuit 22 analyzes the header of the conversation data transmitted from the wireless telephone 7 via the wireless LAN I/F circuit 21, and determines the conversation data are priority data if the same header as that of the conversation data exists in the priority queue table 24A and the data are non-priority data if the same header as that of the conversation data does not exist in the priority queue table 24A.

If the conversation data are determined to be priority data, the conversation data are transferred to the priority queue 25A of the buffer circuit 25 corresponding to the level of the priority of the conversation data. If the conversation data are determined to be non-priority data, the conversation data are transferred to the non-priority queue 25B.

The transmission control circuit 26 transmits the conversation data buffered in the priority queue 25A to the conversation partner via the wireless LAN I/F circuit 21 in order of priority and thereafter transmits the conversation data buffered in the non-priority queue 25B in the similar way.

Figure 4A:
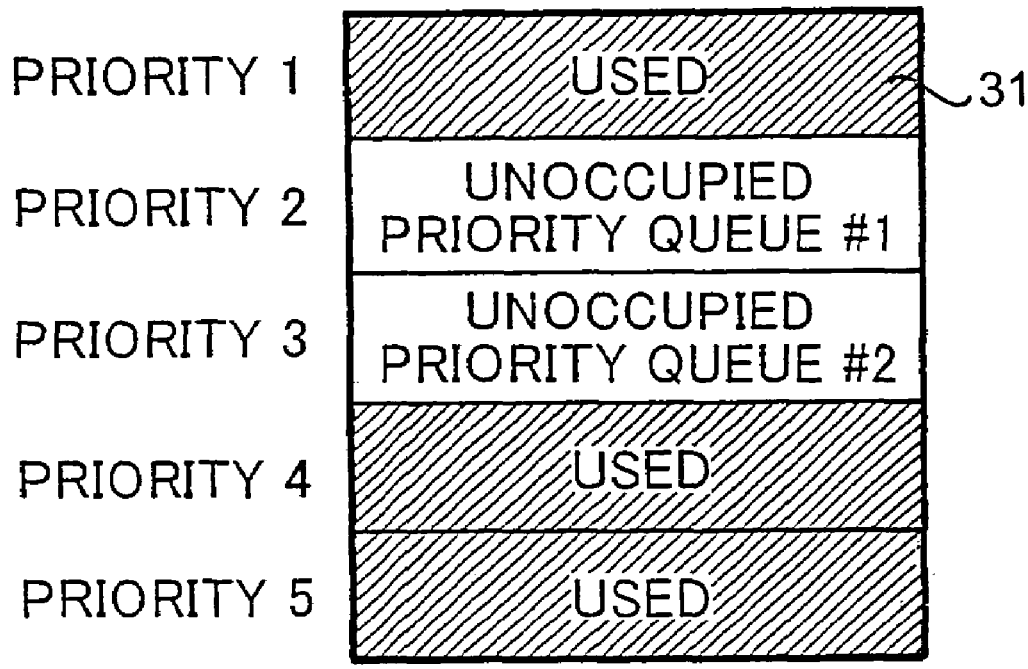
FIGS. 4A and 4B are a diagram showing the contents of a queue information table used for explaining the setting of the priority.

The setting of the priority of the communication data is conducted by the control circuit 13 of the host apparatus in the way as follows:

For conversation in a single base station or the wireless LAN base station 20-1 the control circuit 13 detects unoccupied priority queues #1 and #2 from a table 31 of the queue information table 14A. The table 31 is as shown in FIG. 4A and relates to the wireless LAN base station 20-1. The control circuit 13 compares the priorities 2 and 3 of the unoccupied priority queues #1 and #2, selects the higher priority and regards the higher priority as the priority of the conversation data in the wireless LAN base station 20-1.

If one connection is assigned to each priority, "unoccupied" means that the connection is not used. If two or more connections are assigned to each priority, "unoccupied" means that there are one or more unused connections.

Figure 4B:
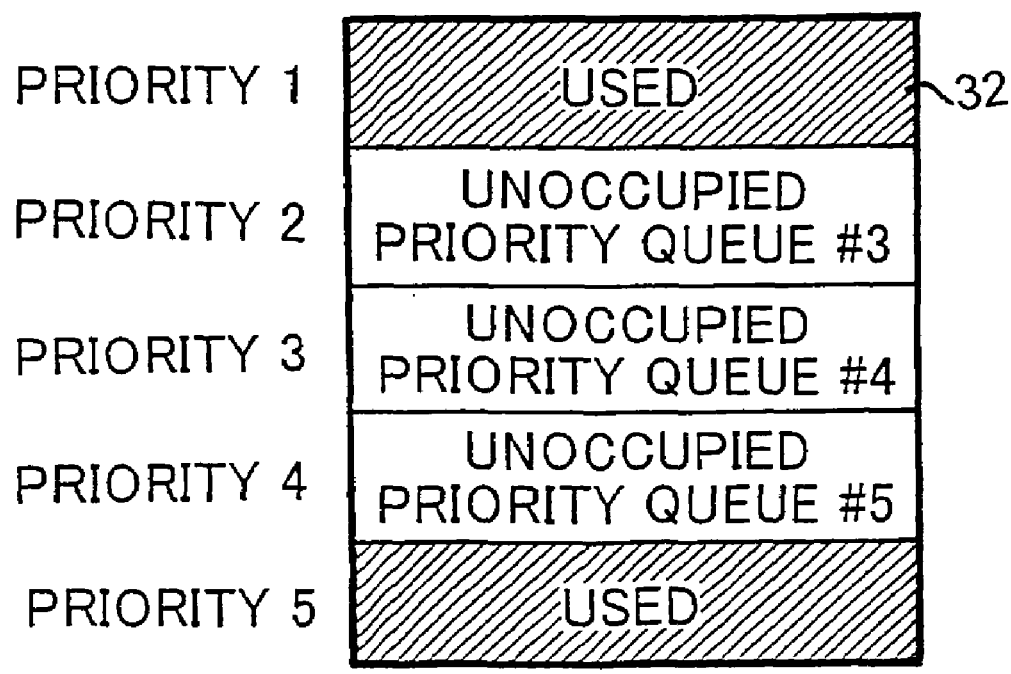

For conversation between two base stations or between the wireless LAN base stations 20-1 and 20-2, the control circuit 13 detects unoccupied priority queues #1 and #2 from the table 31 of the queue information table 14A. The table 31 is as shown in FIG. 4A and relates to the wireless LAN base station 20-1. Thereafter, the control circuit 13 detects unoccupied priority queues #3, #4 and #5 from a table 32 of the queue information table 14A. The table 32 is as shown in FIG. 4B and relates to the wireless LAN base station 20-2. The control circuit 13 compares the priorities 2 and 3 of the unoccupied priority queues #1 and #2 with the priorities 2-4 of the unoccupied priority queues #3-#5, and selects the priority 2 which is the highest for both the base stations 20-1 and 20-2, and regards the highest priority as the priority of the conversation data in the wireless LAN base stations 20-1 and 20-2.

As described above, if the priority of the conversation is determined, the priority queues of the same priority are assigned to the conversation data transmitted from one of the two wireless telephones and the conversation data transmitted from the other of the two wireless telephones in the wireless LAN base stations.

In order to assign a priority to the conversation data transmitted from one of the two wireless telephones and another priority to the conversation data transmitted from the other of the two wireless telephones, it is necessary to set at least two priorities of the conversation data in a single wireless LAN base station. To do so, if a plurality of unoccupied priority queues are detected in the wireless LAN base station, then it is sufficient to select continuous priorities, i.e., priorities 2 and 3, among these unoccupied priority queues.

If there is no unoccupied priority queue in the wireless LAN base station, then it is permitted to create a new priority queue and regard the priority of the priority queue as the priority of the conversation data.

In the above manner, the host apparatus 10 sets the priority on the basis of the situation of setting of the priorities in the wireless LAN base stations 20-1 and 20-2, whereby it is possible to disperse the priorities of the conversation data which will be targets of the call origination control. Therefore, it is possible to prevent the lowering of the transmission speed which is otherwise caused when vast data of the same priority are transmitted. In addition, its is possible to adjust the priority of the conversation data transmitted via a plurality of wireless LAN base stations 20-1 and 20-2 so that the priority of conversation data in the wireless LAN base station 20-1 is the same as the priority of the conversation data in the wireless LAN base station 20-2, whereby the QoS in the transmission line is improved.

Next, the operation when the wireless telephone roams among the wireless LAN base stations will be described. FIG. 5 is a sequence diagram of a case where the wireless telephone 7 roams from the wireless LAN base station 20-1 to the wireless LAN base station 20-2.

When the wireless telephone 7 connected to the wireless LAN base station 20-1 moves while communicating (steps S11 and S12) and receives a beacon signal of the wireless LAN base station 20-2 (step S13), the wireless telephone 7 transmits a roaming registration request (IEEE802.11f) to the wireless LAN base station 20-2 (step S14).

Upon receiving the roaming registration request, the wireless LAN base station 20-2 transmits a roaming registration permission notification (IEEE802.11f) to the wireless telephone 7 if the wireless telephone 7 is connectable (step S15). At the same time, the wireless LAN base station 20-2 transmits a roaming start notification (IEEE802.11f), the MAC address and IP address of the wireless telephone 7 which is performing the roaming and the SSID and MAC address of the wireless LAN base station 20-1 which is communicating with the wireless telephone 7 to the host apparatus 10 (step S16). Here, a part of the above information to be transmitted to the host apparatus 10 together with the roaming start notification may be omitted.

In the host apparatus 10, the control circuit 13 specifies the wireless telephone 7 which is performing the roaming, the wireless LAN base station 20-1 which is communicating with the wireless telephone 7 and the wireless LAN base station 20-3 to which the wireless telephone 7 roams on the basis of the information received together with the roaming start notification. Thereafter, the host apparatus refers to the queue information table 14A of the memory circuit 14 to set the priority of the conversation data of the wireless telephone 7, and writes the priority to both the queue information table 14A and the call control table 14C of the memory circuit 14 (step S17). Thereafter, the host apparatus 10 transmits the information of the call origination control table 14C indicating the priority of the conversation data in the wireless LAN base station 20-2 (step S18).

In the wireless LAN base station 20-2, the control circuit 23 writes the priority information in the received call origination control table 14C to the priority queue table 24A (step S19). Thereafter, the wireless LAN base station 20-2 is connected with the wireless telephone 7, and after getting in state of communication (step S20), transmits a hand off notification (IEEE802.11f) to the wireless LAN base station 20-1 (step S21) and transmits roaming completion notification (IEEE802.11f) to the host apparatus 10 (step S22).

Upon receiving the hand off notification, the wireless LAN base station 20-1 disconnects the communication with the wireless telephone 7 (step S23). Thereafter, the wireless telephone 7 performs communication via the wireless LAN base station 20-2 which is the destination of the roaming. The wireless LAN base station 20-2 transmits the conversation data of the wireless telephone 7 in accordance with the priority of the wireless telephone 7, which is similar to the above.

The setting of the priority of the conversation is conducted by the control circuit 13 of the host apparatus in the way as follows:

The control circuit 13 detects unoccupied priority queues of the wireless LAN base station 20-2 which is the destination of the roaming, selects the priority which is the same as that of the priority queue which has been used for the conversation data of the wireless telephone 7 in the wireless LAN base station 20-1 if a priority queue having such a priority is found in the detected unoccupied priority queues, and regard such a priority as the priority of the conversation data in the wireless LAN base station 20-2.

If priority queue having the same priority as that of the priority queue which has been used for the conversation data of the wireless telephone 7 in the wireless LAN base station 20-1 is not found in the detected unoccupied priority queues, then the control circuit 13 detects unoccupied priority queues of both of the base stations 20-1 and 20-2. If there is a unoccupied priority queue of the base station 20-1 having the same priority as a unoccupied priority queue of the base station 20-2, then the control circuit 13 selects such priority. In this case, it is necessary to notify the new priority to not only the wireless LAN base station 20-2 which is the destination of the roaming but also the wireless LAN base station 20-1.

If there is no unoccupied priority queue of the wireless LAN base station 20-1 having the same priority as a unoccupied priority queue of the wireless LAN base station 20-2, then the control circuit 13 selects a priority which is closest to the priority of the conversation data of the wireless telephone 7 in the wireless LAN base station 20-1 from the unoccupied priority queues of the wireless LAN base station 20-2 which is the destination of the roaming, and the selected priority is regarded as the priority of the conversation data in the wireless LAN base station 20-2. However, it is permitted that the priority of the conversation data in the wireless LAN base station 20-1 to which the wireless telephone 7 is connected is changed so that the priorities of the conversation data in the wireless LAN base stations 20-1 and 20-2 become closer to each other. In this case, it is necessary to notify the new priority to not only the wireless LAN base station 20-2 which is the destination of the roaming but also the wireless LAN base station 20-1 to which the wireless telephone 7 is connected.

In the above way, the priorities of the conversation data in the wireless LAN base stations 20-1 and 20-2 are adjusted in the vicinity of the roaming, whereby the variation of the priority in the vicinity of the roaming is reduced and the QoS on the communication line is improved.

Figure 6:
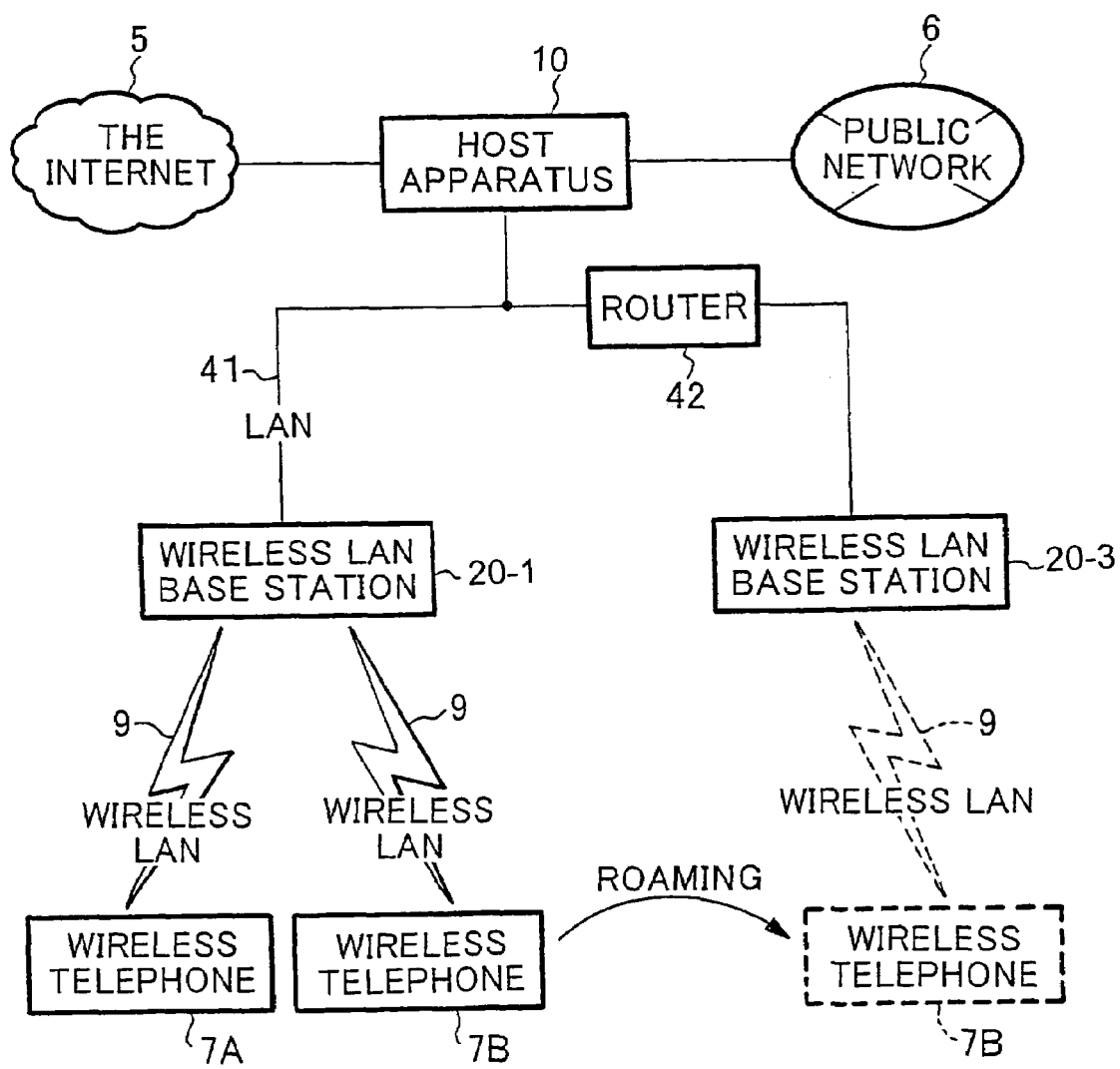
FIG. 6 is a block diagram showing the state in which a wireless telephone roams between wireless LAN base stations of different subnets.
Figure 7:
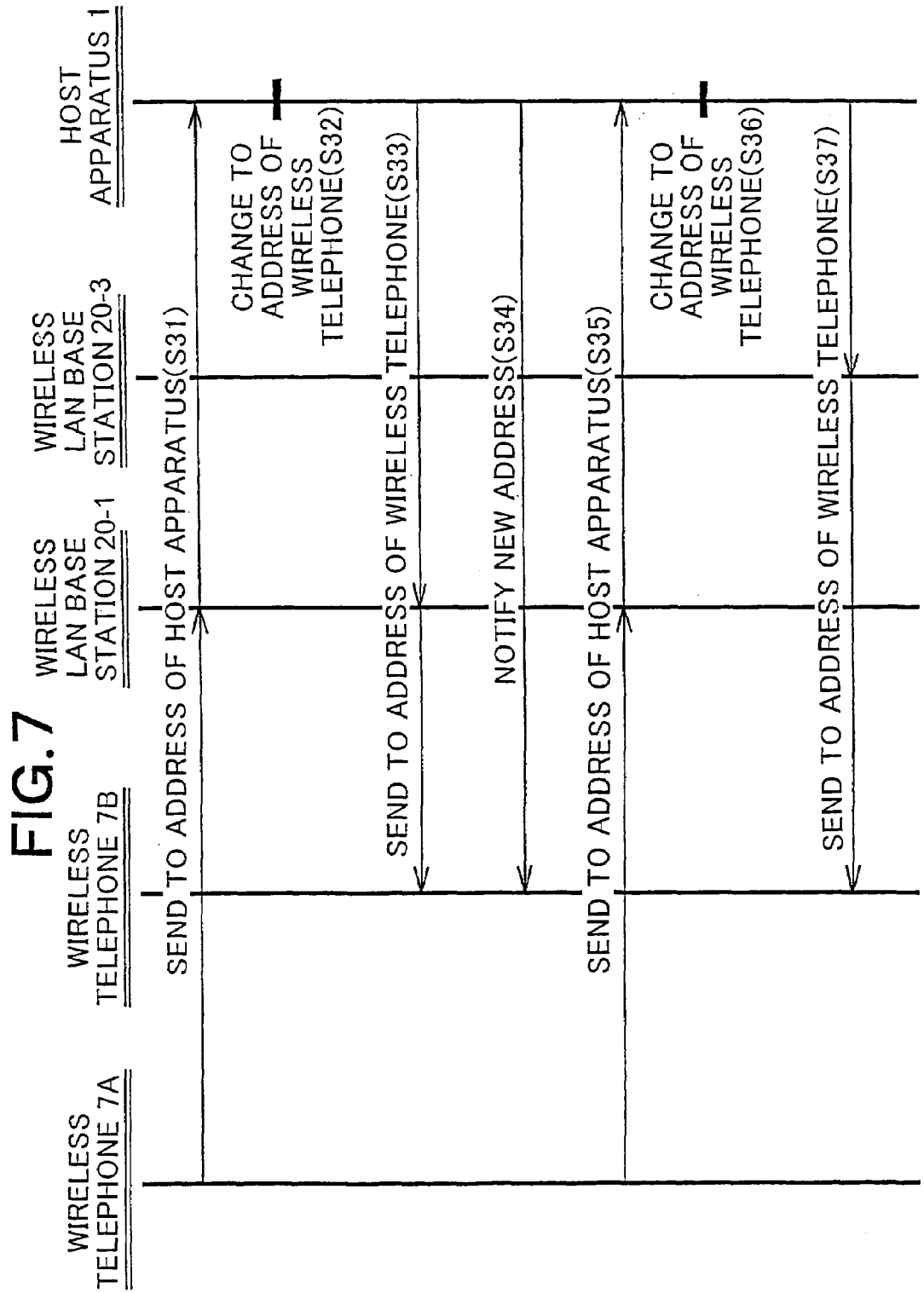
FIG. 7 is a sequence diagram showing operation of the wireless LAN system when a wireless telephone roams from a subnet to another subnet.

Next, the operation in a case where a wireless telephone moves and roams to a wireless LAN base station of another subnet while the wireless telephone is connected in a network divided into subnets will be explained with reference to FIGS. 6 and 7.

Suppose, for example, a case where a wireless telephone 7A transmits a call origination request to the host apparatus 10 via the wireless LAN base station 20-1 and the conversation partner is a wireless telephone 7B. Upon receiving the call origination request, the host apparatus 10 has the wireless telephone 7A transmit the conversation data (for example, RTP (Real Time Transport Protocol)) to the IP address and MAC address of the host apparatus 10 (step S31). Upon receiving the conversation data transmitted from the wireless telephone 7A, the host apparatus 10 changes the destination of the received conversation data from the IP address and MAC address of the host apparatus 10 to the IP address and MAC address of the wireless telephone 7B which is the conversation partner (step S32), and transfers the conversation data (step S33).

Here, suppose a case where the wireless telephone 7B which is the conversation partner roams from the wireless LAN base station 20-1 to the wireless LAN base station 20-3 which are connected via a router 42 in a LAN 41.

Upon receiving a roaming start notification from the wireless LAN base station 20-3 which is the destination of the roaming, the host apparatus 10 notifies the wireless telephone 7B of the IP address which will be used in the destination of the roaming (step S34). Assignment of the IP address may be conducted by a DHCP (Dynamic Host Configuration Protocol) server or the assignment may be realized by providing an IP address table holding a plurality of predetermined IP addresses in the memory circuit 14 and assigning an IP address selected from the IP address table.

The wireless telephone 7B memorizes a new IP address when it receives the new IP address from the host apparatus 10 and changes the local IP address to the new IP address notified from the host apparatus 10 when it receives a roaming completion notification from the wireless LAN base station 20-3 which is the destination of the roaming. This roaming completion notification is transmitted in a period between step S19 and S20 and is not shown in the drawings.

Upon receiving a roaming completion notification, the host apparatus 10 changes the destination of the conversation data transmitted from the wireless telephone 7A from the IP address and MAC address of the host apparatus 10 to the new IP address and MAC address of the wireless telephone 7B which is the conversation partner, and transmits the conversation data (steps S35, S36 and S37).

The host apparatus 10 relays the conversation data of the wireless telephone 7B which has roamed in the above way, whereby even when the wireless telephone 7B roams between the wireless LAN base stations 20-1 and 20-3 which belong different subnets connected by the router 42, the wireless telephone 7B may keep the conversation.

Figure 8:
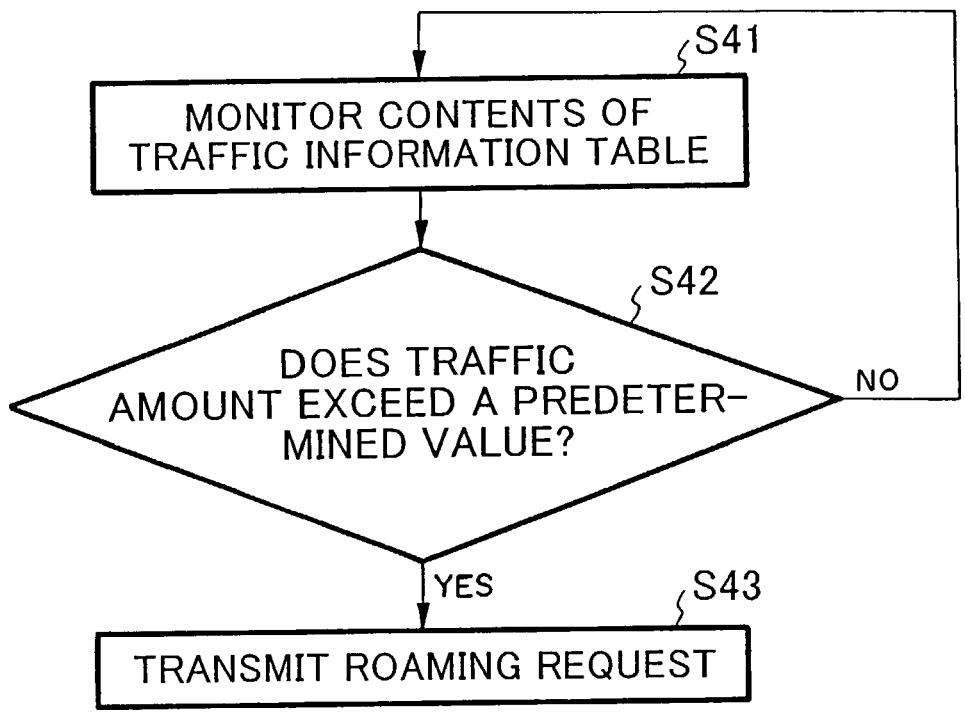
FIG. 8 is a flow chart showing operation of a control circuit of the host apparatus when it detects that a traffic amount of a wireless LAN base station exceeds a predetermined value.

Next, the operation in a case where the wireless LAN base station suffers from overload will be described with reference to FIG. 8.

As described above, each of the wireless LAN base stations 20-1 and 20-2 periodically transmits the information in the traffic table 24B, and the host apparatus 10 updates the contents of the traffic table 14B on the basis of the received information.

In addition, in the host apparatus 10, the control circuit 13 periodically monitors the contents of the traffic information table 14B (step S41). Here, if it is detected that the traffic amount of the wireless LAN base station 20-1 exceeds a predetermined value (step S42), then the host apparatus 10 determines that the wireless LAN base station 20-1 is suffering from overload, and transmits a roaming request to the wireless telephone connected to the wireless LAN base station 20-1 (step S43).

Upon receiving the roaming request, the wireless telephone 7 searches for a wireless LAN base station to which the wireless telephone 7 may roam, and if there is a wireless LAN base station to which the wireless telephone 7 may roam, the wireless telephone 7 roams to the wireless LAN base station.

If connections of wireless telephones concentrates in a single wireless LAN base station and the wireless LAN base station suffers from overload, then the wireless telephones connected to the wireless LAN base station suffering from overload are moved to a neighbor wireless LAN base station having a small number of connections, whereby the overload on the wireless LAN base station is prevented and QoS is kept.

Figure 9:
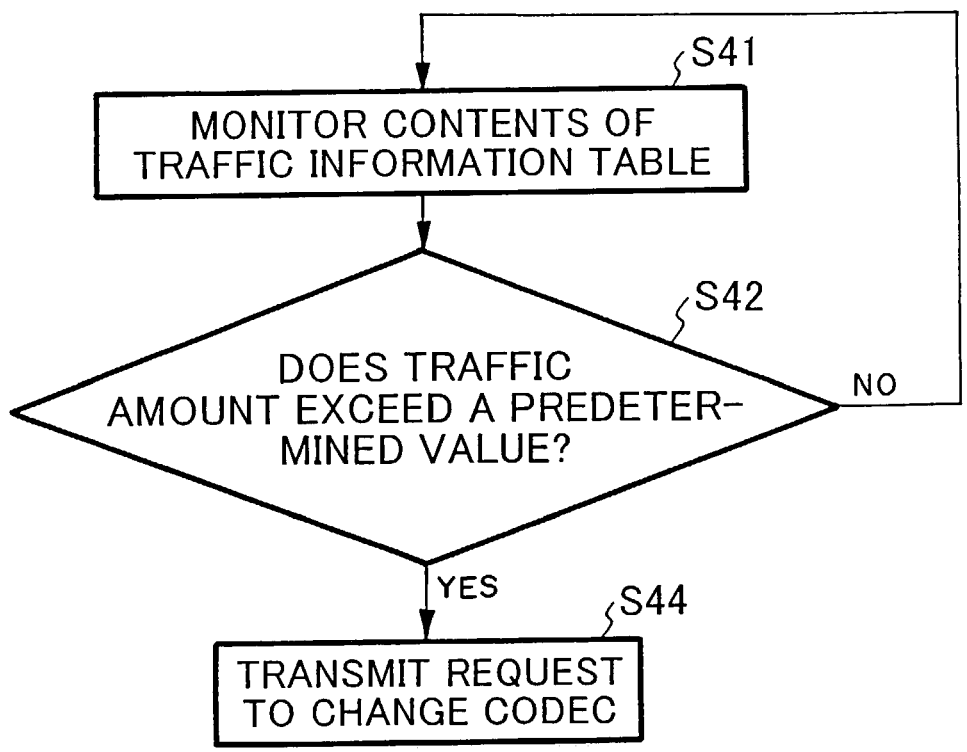
FIG. 9 is a flow chart showing another operation of the control circuit of the host apparatus when it detects that a traffic amount of a wireless LAN base station exceeds a predetermined value.

Referring to FIG. 9, if the wireless telephone 7 has a function of changing an audio codec (such as G.711 and G.729), then it is permitted that the host apparatus 10 transmits a request to change the audio codec to the wireless telephone 7 (step S44). In addition, if the wireless telephone 7 has a function of TV telephone and a function of changing a video codec, then it is permitted that the host apparatus 10 transmits a request to change the video codec to the wireless telephone 7. Further, if the wireless telephone 7 has a function of changing a compression ratio (or bit rate) of the codec, then it is permitted that the host apparatus 10 transmits a request to change the compression ratio of the codec to the wireless telephone 7. By having the wireless telephone 7 change the codec in response to the request from the host apparatus 10 to reduce the amount of communication, the traffic of the wireless LAN base station 20-1 which is suffering from overload is reduced and QoS is kept.

Referring to FIG. 10, if it is detected that the traffic amount of the wireless LAN base station 20-1 exceeds a predetermined value and if it is detected that the traffic amount of the wireless LAN base station 20-1 falls below another predetermined value due to deterioration of communication circumstance of the wireless LAN base station 20-1 while the control circuit 13 is monitoring the contents of the traffic information table 14B (step S45), then a mail server transmits an e-mail including information for specifying the abnormal wireless LAN base station 20-1 such as the MAC address and SSID to an e-mail address of a network manager who has been registered (step S46). This enables the network manager to quickly cope with the abnormality of the wireless LAN base station 20-1.

Referring to FIG. 11, if it is detected that the wireless channels of the wireless LAN base stations 20-1 and 20-2 connected to the wireless telephones 7 and 8 which are controlling call origination are identical and the wireless LAN base stations 20-1 and 20-2 suffer from overload when the control circuit 13 is monitoring the contents of the traffic information table 14B (steps S51 and S52), then, for example, the host apparatus 10 transmits a roaming request to the wireless telephone 7 (step S53) and a power saving mode request to the wireless LAN base station 20-1 (step S54). It is sufficient that one of the wireless LAN base stations 20-1 and 20-2 is selected as the destination of the power saving mode request. One of the wireless LAN base stations 20-1 and 20-2 may be a base station of which MAC address is larger or smaller, SSID value is larger or smaller or the traffic condition is worse.

Upon receiving the roaming request, the wireless telephone 7 searches for a wireless LAN base station to which the wireless telephone 7 may roam, and if there is such a wireless LAN base station, then the wireless telephone 7 roams to the wireless LAN base station.

If the wireless LAN base station 20-1 receives the power saving mode request, then the wireless LAN base station 20-1 gets into DOZE mode (or standby mode) of IEEE802.11. While getting into DOZE mode, the wireless telephone is not connected to the wireless LAN base station 20-1. The wireless LAN base station 20-1 getting into DOZE mode may exits the DOZE mode by a start notification transmitted from the host apparatus 10.

By the above operation, collision of wireless channels between the wireless LAN base stations 20-1 and 20-2 is prevented, delay and drop out of the communication data are reduced, and QoS is kept.

Referring to FIG. 12, it is permitted that the host apparatus 10 has a function of measuring the traffic amount of conversation data transmitted from the wireless telephones 7 and 8 and a function of totalizing CRC (Cyclic Redundancy Check) errors of the conversation data and measuring an error rate which is proportional to the number of errors per unit time (step S56), and, for example, if the traffic amount of conversation data transmitted from the wireless telephone 7 falls below a predetermined value and the error rate exceeds another predetermined value (step S57), then the host apparatus 10 sends a roaming request to the wireless telephone 7 (step S58). The wireless LAN base station to which the wireless telephone 7 is connected is changed in this way, whereby delay and drop out of the conversation data is reduced, and QoS is kept.

Referring to FIG. 13 alternatively, if the amount of conversation data transmitted from the wireless telephone 7 falls below a predetermined value and the error rate exceeds another predetermined value (steps S56 and S57), then the host apparatus may request the wireless telephone 7 to change a codec (step S59), whereby delay and drop out of the conversation data is reduced, and QoS is kept.

Provided that each of the wireless telephones 7 and 8 has a jitter buffer, even if delay time of the received data fluctuates, the delay time of the received data may be kept constant by buffering the received data and outputting the buffered data at constant intervals. The jitter buffer should be large enough in memory size in order to cope with a case where fluctuation of delay time of the received data is large. However, if the memory size is large, the period that the received data stay in the buffer becomes long, and the delay time of the received data caused in the jitter buffer always becomes long. Therefore, the host apparatus 10 comprises a device which, if the amount of data transmitted between the wireless telephones 7 and 8 falls below a predetermined value and the error rate exceeds another predetermined value, notifies the wireless telephones 7 and 8 of such phenomenon, the memory size of the jitter buffer is variable, and each of the wireless telephones 7 and 8 comprises a device which enlarges the memory size of the jitter buffer than usual if it receives the notification from the host apparatus 10. By these measures, delay time of the received data in the jitter buffer is suppressed in normal operation, while if the delay time of the received data fluctuates largely due to deterioration of communication circumstance, the largely fluctuated data are buffered and the delay time is kept constant.

Alternatively, the host apparatus 10 may comprise a device which, if the amount of data transmitted between the wireless telephones 7 and 8 falls below a predetermined value and the error rate exceeds another predetermined value, notifies the wireless telephones 7 and 8 of such phenomenon, and each of the wireless telephones 7 and 8 comprises a device which transmits the same data repeatedly if it receives the notification from the host apparatus 10. By these measures, the possibility that the reception side receives data having reduced errors is increased. When each of the wireless telephones 7 and 8 transmits the same data repeatedly, the same data may be duplicated in a single packet or a packet may include data which are also transmitted in the preceding and following packets. In the latter case, each of the wireless telephones 7 and 8 needs to comprise a structure which buffers transmitted data for a predetermined time.

The wireless LAN system as described above, the functions of the host apparatus 10 and the wireless LAN base stations 20-1 and 20-2 constituting the wireless LAN system may be embodied by causing a computer to execute a program.

As described above, in the wireless LAN system of the present invention, the host apparatus grasps the situation of setting of the priorities in the wireless LAN base stations, and updates the setting of the priorities on the basis of the situation if needs arise, whereby the levels of priority of the data which are subjected to the call origination control may be dispersed. Therefore, the decrease of the transmission speed which otherwise is caused when vast data of the same priority are transmitted is prevented. In addition, the priorities of data transmitted via a plurality of wireless LAN base stations may be adjusted so that the priority in one wireless LAN base station is the same as that in the other wireless LAN base station. Therefore, QoS of the communication line is improved.

The level of the priority of data in the wireless LAN base stations in the vicinity of the roaming may be adjusted, whereby variation of the level of the priority in the vicinity of the roaming may be reduced, and QoS of the communication line is improved.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A wireless Local Area Network (LAN) system comprising:
   a plurality of wireless LAN base stations, each of which is connected with wireless terminals via a wireless LAN; and
   a host apparatus which controls call originations of said wireless terminals via said plurality of wireless LAN base stations,
   the host apparatus connected wirelessly to each LAN base station,
   wherein each of said plurality of wireless LAN base stations comprises:
   wireless LAN I/F circuit that receives data transmitted from a wireless terminal;
   a priority queue table which contains relations between headers of data and priorities and in which priority queue table the headers and the related priorities of the data are associated to each other;
   a header analyzing circuit which determines a priority of data transmitted from a wireless terminal on the basis of a comparison of a header of the data transmitted from the wireless terminal to a corresponding header and the related priority of the corresponding header that is stored in said priority queue table, wherein the header analyzing circuit analyzes the header of the data received by the wireless LAN I/F circuit and determines that the data are priority data based on finding the same header as the header of the received data in the priority queue table and the related priority of the same header;
   priority queues which temporarily store data of respective priorities based on the analysis of the header analyzing circuit;
   a first control circuit connected to receive the analysis of the header analyzing circuit and which enqueues the data transmitted from the wireless terminal to the priority queue of the priority determined on the basis of the received analysis of said header analyzing circuit and updates said priority queue table on the basis of priority information transmitted from said host apparatus; and
   a transmission control circuit which transmits the data which have been stored in said priority queues in order of priority to a destination terminal and transmits said priority queue table to the host apparatus,
   wherein said host apparatus comprises:
   a queue information table which contains contents of said priority queue tables of said plurality of wireless LAN base stations, the contents of said priority queue tables being transmitted from said transmission control circuit of each wireless LAN base station; and
   a second control circuit which determines a priority of data to be transmitted between wireless terminals on the basis of said queue information table and transmits said priority information containing the determined priority and side information to at least one of said plurality of wireless LAN base stations via which the data to be transmitted between the wireless terminals route.

2. The wireless LAN system as set forth in claim 1, wherein said second control circuit comprises means, if the data to be transmitted between the wireless terminals route via at least two wireless LAN base stations, for determining the priority of the data so that the priority in one of at least the two wireless LAN base stations is the same as or close to the priority in the other of at least the two wireless LAN base stations.

3. The wireless LAN system as set forth in claim 1, wherein said second control circuit comprises means, if a wireless terminal roams from a first wireless LAN base station to a second wireless LAN base station, for determining the priority of the data so that the priority in said second wireless LAN base station is the same as or close to the priority in said first wireless LAN base station.

4. The wireless LAN system as set forth in claim 1,
wherein the wireless LAN system contains a plurality of subnets,
wherein said second control circuit comprises:
means for having each wireless terminal transmit data to an address of said host apparatus;
means for changing the address of the data received by said host apparatus to an address of a destination wireless terminal and transferring the data to the address of said destination wireless terminal; and
means, if the destination wireless terminal roams from a first subnet to a second subnet, for notifying said destination wireless terminal of a new address of said destination wireless terminal, changing the address of the data received by said host apparatus to the new address of said destination wireless terminal and transferring the data to the new address of said destination wireless terminal.

5. The wireless LAN system as set forth in claim 1,
wherein said host apparatus further comprises a traffic information table which stores traffic amounts in said plurality of wireless LAN base stations, and
wherein said second control means comprises means, if increase in the traffic amount of a wireless LAN base station is detected by monitoring said traffic information table, for requesting a wireless terminal connected to the wireless LAN base station to roam to another wireless LAN base station.

6. The wireless LAN system as set forth in claim 1,
wherein said host apparatus further comprises a traffic information table which stores traffic amounts in said plurality of wireless LAN base stations, and
wherein said second control means comprises means, if increase in the traffic amount of a wireless LAN base station is detected by monitoring said traffic information table, for requesting a wireless terminal connected to the wireless LAN base station to change a codec.

7. The wireless LAN system as set forth in claim 1,
wherein said host apparatus further comprises a traffic information table which stores traffic amounts in said plurality of wireless LAN base stations, and
wherein said second control means comprises means, if abnormality in the traffic amount of a wireless LAN base station is detected by monitoring said traffic information table, for sending a notification of the abnormality to an e-mail address.

8. The wireless LAN system as set forth in claim 1,
wherein said second control means comprises means, if it is detected that at least two wireless LAN base stations use the same wireless channel, for requesting a wireless terminal connected to one of at least the two wireless LAN base stations to roam to another wireless LAN base station and requesting at least one of at least the two wireless LAN base stations to get into power saving mode.

9. The wireless LAN system as set forth in claim 1,
wherein said second control means comprises means, if it is detected that a traffic amount of data of a wireless terminal falls below a predetermined value and an error rate of the data exceeds another predetermined value, for requesting the wireless terminal to roam to another wireless LAN base station.

10. The wireless LAN system as set forth in claim 1,
wherein said second control means comprises means, if it is detected that a traffic amount of data of a wireless terminal falls below a predetermined value and an error rate of the data exceeds another predetermined value, for requesting the wireless terminal to change a codec.

11. A wireless Local Area Network (LAN) base station comprising:
wireless LAN I/F circuit that receives data transmitted from a wireless terminal;
a priority queue table which contains relations between headers of data and priorities and in which priority queue table the headers and the related priorities of the data are associated to each other;
a header analyzing circuit which determines a priority of data transmitted from a wireless terminal on the basis of a comparison of a header of the data transmitted from the wireless terminal to a corresponding header and the related priority of the corresponding header that is stored in said priority queue table;
priority queues which temporarily store data of respective priorities based on the analysis of the header analyzing circuit;
a first control circuit which enqueues the data transmitted from the wireless terminal to the priority queue of the priority determined on the basis of the received analysis of said header analyzing circuit and updates said priority queue table on the basis of priority information transmitted from said host apparatus; and
a transmission control circuit which transmits the data which have been stored in said priority queues in order of priority and transmits said priority queue table to a host apparatus.

12. A host apparatus comprising:
a queue information table which contains contents of priority queue tables of a plurality of wireless Local Area Network (LAN) base stations, the contents of said priority queue tables being transmitted from a transmission control circuit of each wireless LAN base station; and
a control circuit which determines a priority of data to be transmitted between wireless terminals on the basis of said queue information table and transmits said priority information containing the determined priority and side information to at least one of said plurality of wireless LAN base stations via which the data to be transmitted between the wireless terminals route,
wherein said control circuit comprises means, if the data to be transmitted between the wireless terminals route via at least two wireless LAN base stations, for determining the priority of the data so that the priority in one of at least the two wireless LAN base stations is the same as or close to the priority in the other of at least the two wireless LAN base stations.

13. The host apparatus as set forth in claim 12, wherein said control circuit comprises means, if a wireless terminal roams from a first wireless LAN base station to a second wireless LAN base station, for determining the priority of the data so that the priority in said second wireless LAN base station is the same as or close to the priority in said first wireless LAN base station.

14. A host apparatus comprising:
a queue information table which contains contents of priority queue tables of a plurality of wireless Local Area Network (LAN) base stations, the contents of said priority queue tables being transmitted from a transmission control circuit of each wireless LAN base station; and
a control circuit which determines a priority of data to be transmitted between wireless terminals on the basis of said queue information table and transmits said priority information containing the determined priority and side information to at least one of said plurality of wireless LAN base stations via which the data to be transmitted between the wireless terminals route,
wherein said control circuit comprises:
means for having each wireless terminal transmit data to an address of said host apparatus;
means for changing the address of the data received by the host apparatus to an address of a destination wireless terminal and transferring the data to the address of said destination wireless terminal; and
means, if the destination wireless terminal roams from a first subnet to a second subnet, for notifying said destination wireless terminal of a new address of said destination wireless terminal, changing the address of the data received by the host apparatus to the new address of said destination wireless terminal and transferring the data to the new address of said destination wireless terminal.

15. A host apparatus comprising:
a queue information table which contains contents of priority queue tables of a plurality of wireless Local Area Network (LAN) base stations, the contents of said priority queue tables being transmitted from a transmission control circuit of each wireless LAN base station; and
a control circuit which determines a priority of data to be transmitted between wireless terminals on the basis of said queue information table and transmits said priority information containing the determined priority and side information to at least one of said plurality of wireless LAN base stations via which the data to be transmitted between the wireless terminals route,
further comprising a traffic information table which stores traffic amounts in said plurality of wireless LAN base stations, and
wherein said control means comprises means, if increase in the traffic amount of a wireless LAN base station is detected by monitoring said traffic information table, for requesting a wireless terminal connected to the wireless LAN base station to roam to another wireless LAN base station.

16. The host apparatus as set forth in claim 15, wherein said control means comprises means, if increase in the traffic amount of a wireless LAN base station is detected by monitoring said traffic information table, for requesting a wireless terminal connected to the wireless LAN base station to change a codec.

17. The host apparatus as set forth in claim 15, wherein said control means comprises means, if abnormality in the traffic amount of a wireless LAN base station is detected by monitoring said traffic information table, for sending a notification of the abnormality to an e-mail address.

18. A host apparatus comprising:
a queue information table which contains contents of priority queue tables of a plurality of wireless Local Area Network (LAN) base stations, the contents of said priority queue tables being transmitted from a transmission control circuit of each wireless LAN base station; and
a control circuit which determines a priority of data to be transmitted between wireless terminals on the basis of said queue information table and transmits said priority information containing the determined priority and side information to at least one of said plurality of wireless LAN base stations via which the data to be transmitted between the wireless terminals route,
wherein said control means comprises, if it is detected that at least two wireless LAN base stations use the same wireless channel, for requesting a wireless terminal connected to one of at least the two wireless LAN base stations to roam to another wireless LAN base station and requesting at least one of at least the two wireless LAN base stations to get into power saving mode.

19. The host apparatus as set forth in claim 18, wherein said control means comprises, if it is detected that a traffic amount of data of a wireless terminal falls below a predetermined value and an error rate of the data exceeds another predetermined value, for requesting the wireless terminal to roam to another wireless LAN base station.

20. The host apparatus as set forth in claim 18, wherein said control means comprises, if it is detected that a traffic amount of data of a wireless terminal falls below a predetermined value and an error rate of the data exceeds another predetermined value, for requesting the wireless terminal to change a codec.

21. A method for determining a priority of data transmitted between wireless terminals via wireless Local Area Network (LAN) base stations comprising the steps of:
causing each of said wireless LAN base stations to hold a priority queue table which contains relations between headers of data and priorities and in which priority queue table the headers and the related priorities of the data are associated to each other;
causing a plurality of wireless LAN base stations to transmit respective priority queue tables to a host apparatus;
causing said host apparatus to hold a queue information table which contains said queue tables transmitted from said plurality of wireless LAN base stations;
causing said host apparatus to determine a priority of data to be transmitted between wireless terminals on the basis of said queue information table;
causing said host apparatus to transmit priority information containing the determined priority and side information to at least one of said plurality of wireless LAN base stations via which the data to be transmitted between the wireless terminals route;
causing at least one of said plurality of wireless LAN base stations via which the data to be transmitted between the wireless terminals route to update said priority queue table on the basis of the priority information transmitted from said host apparatus; and
causing at least one of said plurality of wireless LAN base station via which the data to be transmitted between the wireless terminals route to determine a priority of data to be transmitted from one of the wireless terminals on the basis of a header of the data and said priority queue table.

22. The method as set forth in claim 21, wherein in said step of causing said host apparatus to determine a priority of data to be transmitted between wireless terminals on the basis of said queue information table, if the data to be transmitted between the wireless terminals route via at least two wireless LAN base stations, said host apparatus determines the priority of the data so that the priority in one wireless LAN base station is the same as or close to the priority in another wireless LAN base station.

23. The method as set forth in claim 21, wherein in said step of causing said host apparatus to determine a priority of data to be transmitted between wireless terminals on the basis of said queue information table, if a wireless terminal roams from a first wireless LAN base station to a second wireless LAN base station, said host apparatus determines the priority of the data so that the priority in said second wireless LAN base station is the same as or close to the priority in said first wireless LAN base station.

24. The method as set forth in claim 21, further comprising the steps of:
   causing a wireless terminal transmit data to an address of said host apparatus;
   causing said host terminal to change the address of the data received by said host terminal to an address of a destination wireless terminal and transfer the data to the address of said destination wireless terminal; and
   if the destination wireless terminal roams from a first subnet to a second subnet, causing said host apparatus to notify said destination wireless terminal of a new address of said destination wireless terminal, change the address of the data received by said host apparatus to the new address of said destination wireless terminal and transfer the data to the new address of said destination wireless terminal.

25. The method as set forth in claim 21, further comprising the steps of:
   causing said host apparatus to hold a traffic information table which stores traffic amounts in said plurality of wireless LAN base stations; and
   if increase in the traffic amount of a wireless LAN base station is detected by monitoring said traffic information table, causing said host apparatus to request a wireless terminal connected to the wireless LAN base station to roam to another wireless LAN base station.

26. The method as set forth in claim 21, further comprising the steps of:
   causing said host apparatus to hold a traffic information table which stores traffic amounts in said plurality of wireless LAN base stations; and
   if increase in the traffic amount of a wireless LAN base station is detected by monitoring said traffic information table, causing said host apparatus to request a wireless terminal connected to the wireless LAN base station to change a codec.

27. The method as set forth in claim 21, further comprising the steps of:
   causing said host apparatus to hold a traffic information table which stores traffic amounts in said plurality of wireless LAN base stations; and
   if abnormality in the traffic amount of a wireless LAN base station is detected by monitoring said traffic information table, causing said host apparatus to send a notification of the abnormality to an e-mail address.

28. The method as set forth in claim 21, further comprising the step of, if it is detected that at least two wireless LAN base stations use the same wireless channel, causing said host apparatus to request a wireless terminal connected to one of at least the two wireless LAN base stations to roam to another LAN base station and request at least one of at least the two wireless LAN base stations to get into power saving mode.

29. The method as set forth in claim 21, further comprising the step of, if it is detected that a traffic amount of data of a wireless terminal falls below a predetermined value and an error rate of the data exceeds another predetermined value, causing said host apparatus to request the wireless terminal to roam to another wireless LAN base station.

30. The method as set forth in claim 21, further comprising the step of, if it is detected that a traffic amount of data of a wireless terminal falls below a predetermined value and an error rate of the data exceeds another predetermined value, causing said host apparatus to request the wireless terminal to change a codec.

31. The system of claim 1, wherein the header analyzing circuit analyzes the header of the data received by the wireless LAN I/F circuit and determines that the data are not priority data based on finding the same header as the header of the received data does not exist in the priority queue table.

* * * * *